US011820385B2

United States Patent
Rose et al.

(10) Patent No.: US 11,820,385 B2
(45) Date of Patent: Nov. 21, 2023

(54) SYSTEM AND METHOD FOR EVALUATING DRIVER PERFORMANCE

(71) Applicant: GM GLOBAL TECHNOLOGY OPERATIONS LLC, Detroit, MI (US)

(72) Inventors: Andrew P. Rose, Glen Allen, VA (US); Donald K. Grimm, Utica, MI (US); Fan Bai, Ann Arbor, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 368 days.

(21) Appl. No.: 16/945,065

(22) Filed: Jul. 31, 2020

(65) Prior Publication Data

US 2022/0032921 A1 Feb. 3, 2022

(51) Int. Cl.
*B60W 40/09* (2012.01)
*B60W 50/14* (2020.01)
*G06Q 40/08* (2012.01)

(52) U.S. Cl.
CPC ........... *B60W 40/09* (2013.01); *B60W 50/14* (2013.01); *G06Q 40/08* (2013.01); *B60W 2050/146* (2013.01); *B60W 2540/30* (2013.01); *B60W 2556/45* (2020.02)

(58) Field of Classification Search
CPC .. B60W 40/09; B60W 50/14; B60W 2556/45; B60W 2050/146; B60W 2540/30; G06Q 40/08
See application file for complete search history.

(56) References Cited

U.S. PATENT DOCUMENTS

| 7,561,951 | B2 * | 7/2009 | Rao | B60W 50/035 340/438 |
| 8,117,049 | B2 * | 2/2012 | Berkobin | G06Q 40/08 701/29.6 |
| 10,354,333 | B1 * | 7/2019 | Hayward | G01S 19/42 |
| 10,782,654 | B2 * | 9/2020 | Campos | G08G 1/0112 |
| 10,832,261 | B1 * | 11/2020 | Chan | G06Q 40/025 |
| 11,242,064 | B1 * | 2/2022 | Ferguson | G08G 1/0129 |

(Continued)

FOREIGN PATENT DOCUMENTS

CN 105374211 B * 1/2018

OTHER PUBLICATIONS

"Meiring, G. Myburgh, H. Dec. 4, 2015, A Review of Intelligent Driving Style Analysis Systems and Related Artificial Intelligence Algorithms, Sensors, MDPI" (Year: 2015).*

*Primary Examiner* — Russell Frejd
*Assistant Examiner* — Christopher R Cardimino (57) ABSTRACT

A driver monitoring system configured to monitor the performance of a driver of a vehicle communicating wirelessly with the driver monitoring system. The system comprises a driver behavior module that receives from the vehicle event data captured by a plurality of sensors in the vehicle and identifies at least one of a plurality of driver behaviors. A behavior characterization module receives from the driver behavior module the at least one identified driver behavior and characterizes the at least one identified driver behavior into at least one of a plurality of behavior categories. A risk assessment module analyzes the at least one characterized driver behavior in the plurality of behavior categories and determines therefrom a driver profile that may include a risk assessment for the driver of the vehicle system.

21 Claims, 6 Drawing Sheets

(56) References Cited

U.S. PATENT DOCUMENTS

2008/0243558 A1* 10/2008 Gupte .................. G06Q 40/08
340/576
2020/0334762 A1* 10/2020 Carver .................. G06Q 40/08

* cited by examiner

SYSTEM AND METHOD FOR EVALUATING DRIVER PERFORMANCE

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The driving performance of a particular driver may be of value to an employer of the driver, particularly if the driver operates a vehicle owned by the employer. Driver performance is useful, for example, in warning or punishing a reckless driver, in setting insurance rates, and in evaluating insurability. These actions may rely on recorded driving history and aggregated class statistics.

Conventional driver monitoring systems generate data by monitoring the onboard diagnostics (OBD) port, which provides only limited information. For example, the OBD port may monitor only driving speed, which may be correlated with local speed limits to determine speeding habits of a particular driver. Present systems may not have access to other useful data from the vehicle, such as collision warning data.

SUMMARY

It is one aspect of the disclosure to provide a driver monitoring system configured to monitor the performance of a driver of a vehicle system that is communicating wirelessly with the driver monitoring system. The system comprises: i) a driver behavior module configured to receive from the vehicle system event data captured by a plurality of sensors in the vehicle system and to identify at least one of a plurality of driver behaviors; ii) a behavior characterization module configured to receive from the driver behavior module the at least one identified driver behavior and to characterize the at least one identified driver behavior into at least one of a plurality of behavior categories; and ii) a risk assessment module configured to analyze the at least one characterized driver behavior in the plurality of behavior categories and to determine therefrom a driver profile that may include a risk assessment for the driver of the vehicle system.

In one embodiment, the driver monitoring system is configured to compare the at least one identified driver behavior to a threshold value and, in response to the comparison, to transmit to the driver a warning message.

In another embodiment, the driver monitoring system is configured to determine if the driver is a client of an insurance provider.

In still another embodiment, the driver monitoring system, in response to a determination that the driver is a client of the insurance provider, compares the at least one identified driver behavior to a threshold value associated with the at least one driver behavior.

In yet another embodiment, the driver monitoring system, in response to a determination that at least one identified driver behavior exceeds the threshold value, transmits to the driver a warning message.

In a further embodiment, the warning message informs the driver that the driver has exceed the threshold value.

In a yet further embodiment, the driver monitoring system, in response to a determination that at least one identified driver behavior exceeds the threshold value, increase an insurance premium associated with the driver.

In a still further embodiment, the driver monitoring system, in response to a determination that at least one identified driver behavior exceeds the threshold value, transmits to an owner of the vehicle system a message informing the owner that the driver has exceed the threshold value.

In an embodiment, the driver monitoring system, in response to a determination that at least one identified driver behavior does not exceed the threshold value, offers a reward to the driver.

In another embodiment, the plurality of driver behaviors include at least one of: sharp turns, sudden braking, sudden acceleration, high-speed driving, low-speed driving, tailgating, and frequent lane changes.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Advanced onboard diagnostics and communication systems (e.g., OnStar by GM) enable a vehicle manufacturer to provide a driver monitoring system that executes algorithms that are useful for evaluating driver performance, setting insurance rates, and evaluating insurability of a driver based on a greater number of parameters than are available through the OBD port.

The present disclosure describes a system for monitoring one or more driver habits, such as following distance (or tailgating), lane changes, sudden accelerations, sudden deceleration, swerving, and the like. The disclosed system monitors information from a plurality of vehicle sensors to assess the tailgating habits of a driver. The driver monitoring system uses telematics to report the monitored information to a central office (e.g., employer, insurance company, etc.) for subsequent use in, for example, reprimanding or disciplining the driver or setting insurance rates.

Advantageously, the unique disclosed system uses vehicle sensors to identify tailgating habits, speeding habits, lane changing habits of a driver and uses that habit data for evaluating driver performance and for insurance purposes. The disclosed system may do one or more of the following operations:

a) Monitor and report the number of collision warning alerts that are generated by the collision warning system;
b) Monitor variables provided by the collision warning system to identify the following distance (tailgating) habits of a driver;
c) Periodically transfer following distance data to a server for analysis and processing;
d) In response to a following distance metric falling below a threshold, the server may send a warning to the driver that insurance rates may increase.
e) In response to the following distance metric remaining below the threshold for more than a predetermined time, the server may initiate an increase in insurance premiums for the driver;
f) The following distance metrics may include: average predicted time to stop, average following distance, and/or combined factor of vehicle speed, following distance, and predicted time to stop;
g) For drivers currently not insured, when the following distance metric is below a threshold for a predetermined period, the server may offer an insurance product to the driver;
h) Collect camera/sensor data for time before and after a collision warning activation, send the data to the server, and alert vehicle owner of collision warning activation.
i) The data may be retrieved by the vehicle owner to review or replay the incident (i.e., Game Film mode);
j) Directly contact the driver (Direct Communication mode) via the telematics system without providing any option to answer or disconnect. For example, the server alerts the owner to risky driving behavior and connect the owner of the vehicle operator through the telematics system. The driver cannot ignore this as the voice of the owner plays on the speakers of the vehicle.

Figure 1:
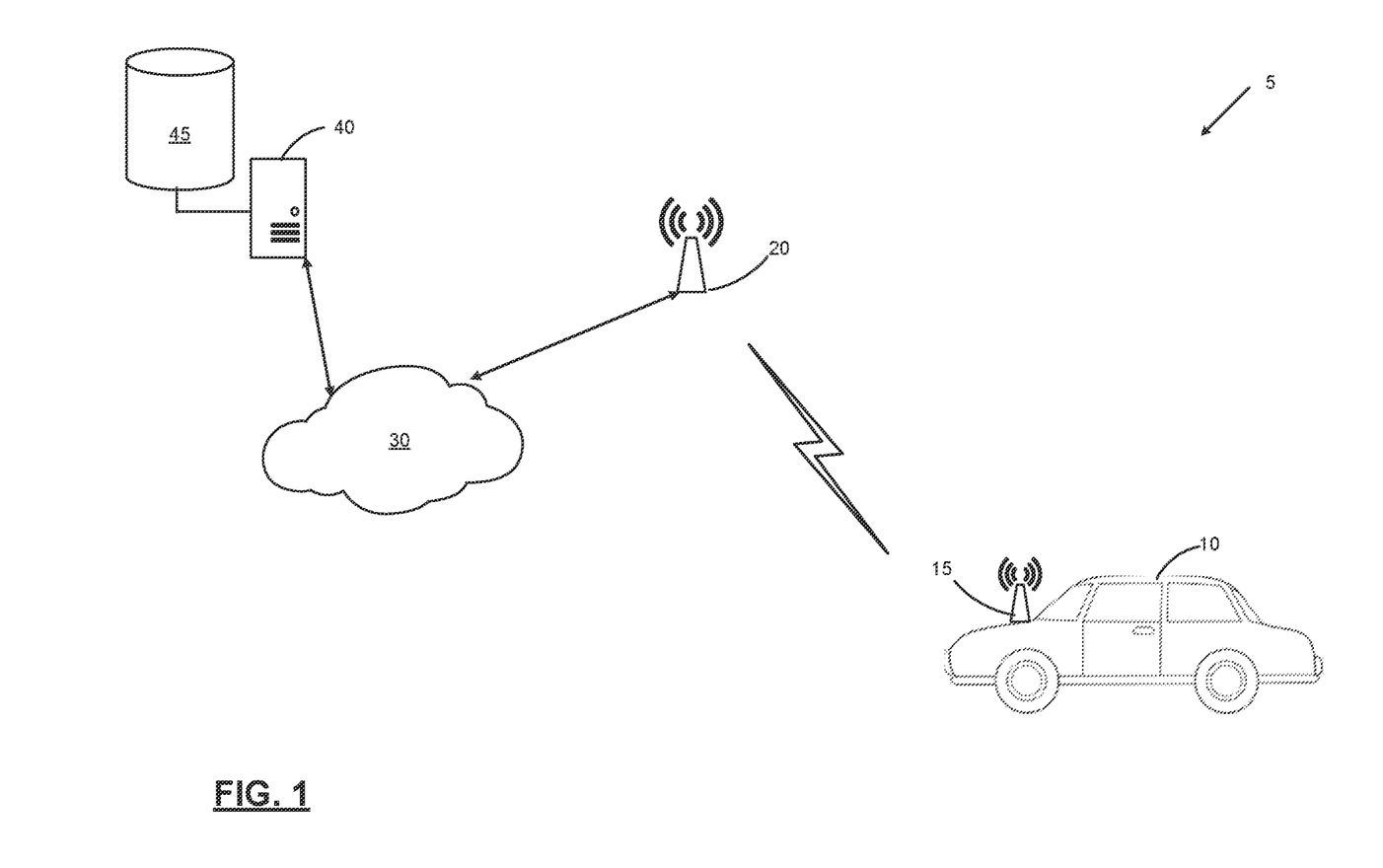
FIG. 1 is an overview of a driver monitoring system according to an embodiment of the present disclosure.

FIG. 1 is an overview of a driver monitoring system 5 for disabling vehicle functions according to an embodiment of the present disclosure. The driver monitoring system 5 comprises a vehicle system 10, a vehicle communication server (VCS) 40, and a vehicle back-office database (DB) 45. The vehicle system 10 includes a wireless access point (AP) 15 that enables the vehicle system 10 to communicate with the VCS 40 via an IP network 30 (e.g., the Internet) and a wireless access point 20. In a typical scenario, the wireless access point 20 is a base station of a cellular network and the wireless access point 15 in the vehicle system 10 is a cellular mobile transceiver.

According to the principles of the present disclosure, the vehicle communication server (VCS) 40 may transmit to the vehicle system 10 instructions that use authentication and integrity protocols securely to retrieve selected vehicle data from a plurality of vehicle sensors. For example, the VCS 40 may transmit a digitally signed, cryptographic token to the AP 15 to enable a control module in the vehicle system 10 to gather sensor data and upload the sensor data to VCS 40.

Figure 2:
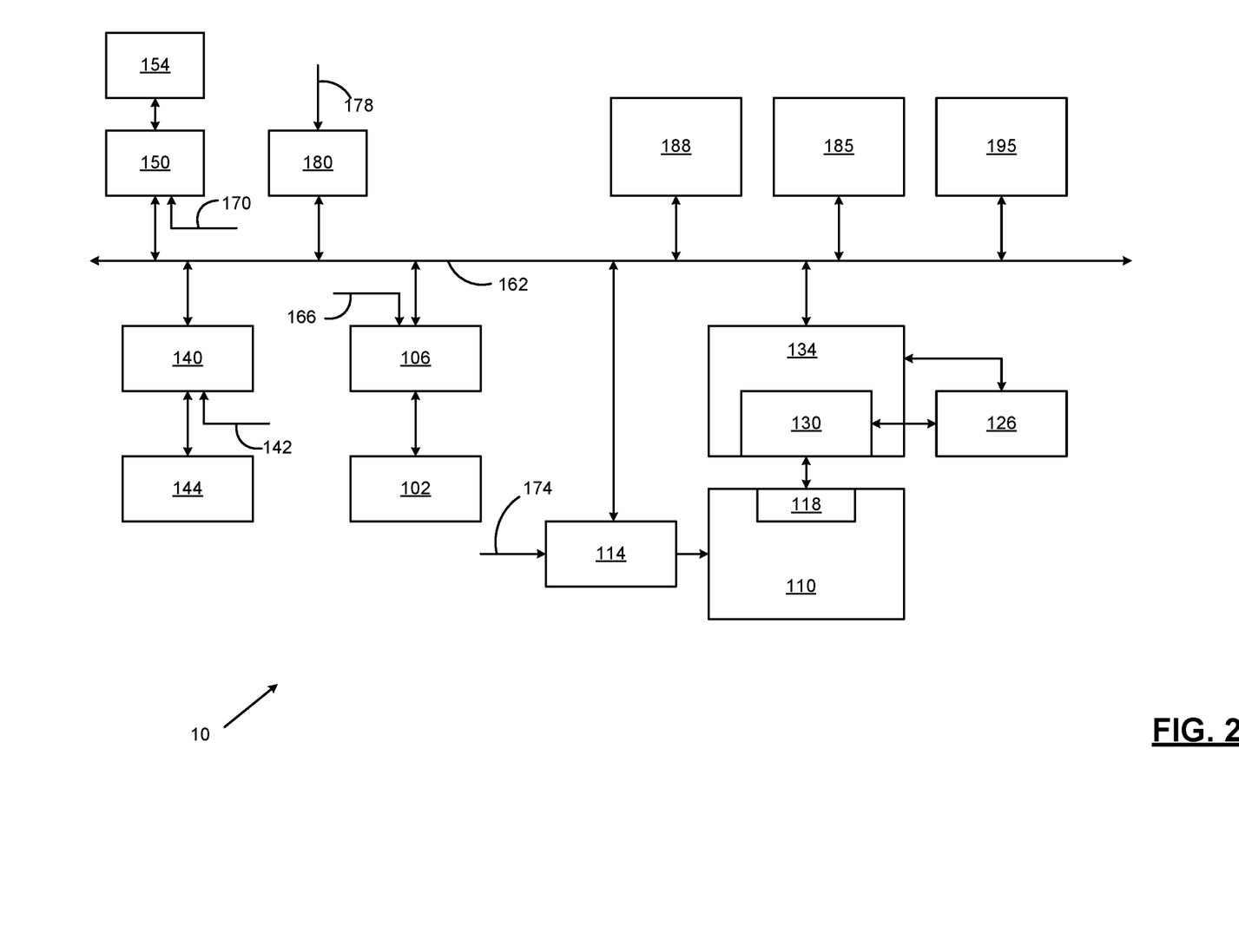
FIG. 2 is a functional block diagram of an exemplary vehicle system that includes a driver monitoring system according to the principles of the present disclosure.

FIG. 2 is a functional block diagram of an exemplary vehicle system 10 that includes a driver monitoring system according to the principles of the present disclosure. While the present disclosure shows and describes a vehicle system 10 for a hybrid vehicle, the present disclosure is also applicable to non-hybrid vehicles incorporating only an internal combustion engine. While the present disclosure uses a vehicle as an exemplary embodiment, the present disclosure is also applicable to non-automobile implementations, such as boats and aircraft.

An engine 102 combusts an air/fuel mixture to generate drive torque. An engine control module (ECM) 106 controls the engine 102 based on one or more driver inputs. For example, the ECM 106 may control actuation of engine actuators, such as an electronically controlled throttle valve, one or more spark plugs, one or more fuel injectors, valve actuators, camshaft phasers, an exhaust gas recirculation (EGR) valve, one or more intake air-flow boost devices, and other suitable engine actuators.

The engine 102 may output torque to a transmission 110. A transmission control module (TCM) 114 controls operation of the transmission 110. For example, the TCM 114 may control gear selection within the transmission 110 and one or more torque transfer devices (e.g., a torque converter, one or more clutches, etc.).

The vehicle system 10 may include one or more electric motors. For example, an electric motor 118 may be implemented within the transmission 110 as shown in the example of FIG. 1A. An electric motor can act either as a generator or as a motor at a given time. When acting as a generator, an electric motor converts mechanical energy into electrical energy. The electrical energy may charge a battery 126 via a power control device (PCD) 130. When acting as a motor, an electric motor generates torque that supplements or replaces torque output by the engine 102. While the example of one electric motor is provided, the vehicle may include zero or more than one electric motor.

A power inverter control module (PIM) 134 may control the electric motor 118 and the PCD 130. The PCD 130 applies (e.g., direct current) power from the battery 126 to the (e.g., alternating current) electric motor 118 based on signals from the PIM 134, and the PCD 130 provides power output by the electric motor 118, for example, to the battery 126. The PIM 134 may be referred to as a power inverter module (PIM) in various implementations.

A steering control module 140 controls steering/turning of wheels of the vehicle, for example, based on driver turning of a steering wheel within the vehicle and/or steering commands from one or more vehicle control modules. A steering wheel angle sensor (SWA) monitors rotational position of the steering wheel and generates a SWA 142 based on the position of the steering wheel. As an example, the steering control module 140 may control vehicle steering via an EPS motor 144 based on the SWA 142. However, the vehicle may include another type of steering system. An electronic brake control module (EBCM) 150 may selectively control brakes 154 of the vehicle.

Modules of the vehicle may share parameters via a controller area network (CAN) 162. The CAN 162 may also be referred to as a car area network. For example, the CAN 162 may include one or more data buses. Various parameters may be made available by a given control module to other control modules via the CAN 162.

The driver inputs may include, for example, an accelerator pedal position (APP) 166 which may be provided to the ECM 106. A brake pedal position (BPP) 170 may be provided to the EBCM 150. A position 174 of a park, reverse, neutral, drive lever (PRNDL) may be provided to the TCM 114. An ignition state 178 may be provided to a body control module (BCM) 180. For example, the ignition state 178 may be input by a driver via an ignition key, button, or switch. At a given time, the ignition state 178 may be one of off, accessory, run, or crank.

According to an exemplary embodiment of the present disclosure, the vehicle system 10 further comprises an advanced computing module 185, a sensors module 188, a map module, and a wireless transceiver (XCVR) module 195. In FIG. 2, the wireless transceiver module 195 corresponds to the wireless access point 15 in FIG. 1. The sensors module 188 may include a plurality of sensors that support, for example, basic cruise control, full speed range adaptive cruise control, and/or semi-autonomous or true autonomous driving. These sensors may include, but are not limited to, an on-board GPS receiver, a plurality of radar detectors and a plurality of cameras that detect objects (e.g., other vehicles) proximate the vehicle system 10, a light detection and ranging (LiDAR) system, a wheel speed sensors, a steering wheel angle (SWA) sensor, a plurality of accelerometers, and the like.

The sensors in sensors module 188 may be used to detect numerous driver events. The radar detectors and cameras, for example, may determine following distance (i.e., potential tailgating). The cameras may detected lane markers and determine whether and how often the vehicle system 10 changes lanes, drifts across the center of the road into oncoming traffic, drifts onto the shoulder of the road, and the like. The accelerometers may detect sudden accelerations, sudden decelerations (i.e., braking), and sudden or exaggerated lateral movements, indicating swerving or sharp turns.

In vehicle system 10, an embedded microprocessor that executes program instructions in an associated embedded memory controls the operations of each of the electronic vehicle subsystems. Hereafter, the microprocessor and memory in each subsystem may be referred to generically as an electronic control unit (ECU) module. The steering control module 140, the engine control module 106, the sensors module 188, and the electronic brake control module 150 are all examples of vehicle subsystems. A dedicated embedded ECU module controls each one of these vehicle subsystems.

The advanced computing module 185 comprises a high performance computing platform that controls many of the higher order functions and lower order functions of the vehicle system 10. In a typical implementation, the advanced computing module 185 may be implemented as a microprocessor and an associated memory. Like the ECU modules in the vehicle subsystems, the advanced computing module 185 also executes a kernel program that controls the overall operation of the advanced computing module 185.

According to the principles of the present disclosure, the advanced computing module 185 consumes information from the sensors module 188 (e.g., wheel speed data, steering wheel angle sensor data, brake status data, LiDAR system data, radar data, camera images, GPS data, accelerometer data, etc.) to determine the speed, direction, and location of the vehicle system 10. The advanced computing module 185 uses the consumed information to send commands to, for example, the steering control module 140, the engine control module 106, and the electronic brake control module 150, to control the speed, braking, and/or direction of the vehicle system 10. The advanced computing module 185 is also responsible for communicating with the VCS 40 and uploading vehicle sensor data requested by the VCS 40 in order to monitor and evaluate driver performance.

Figure 3:
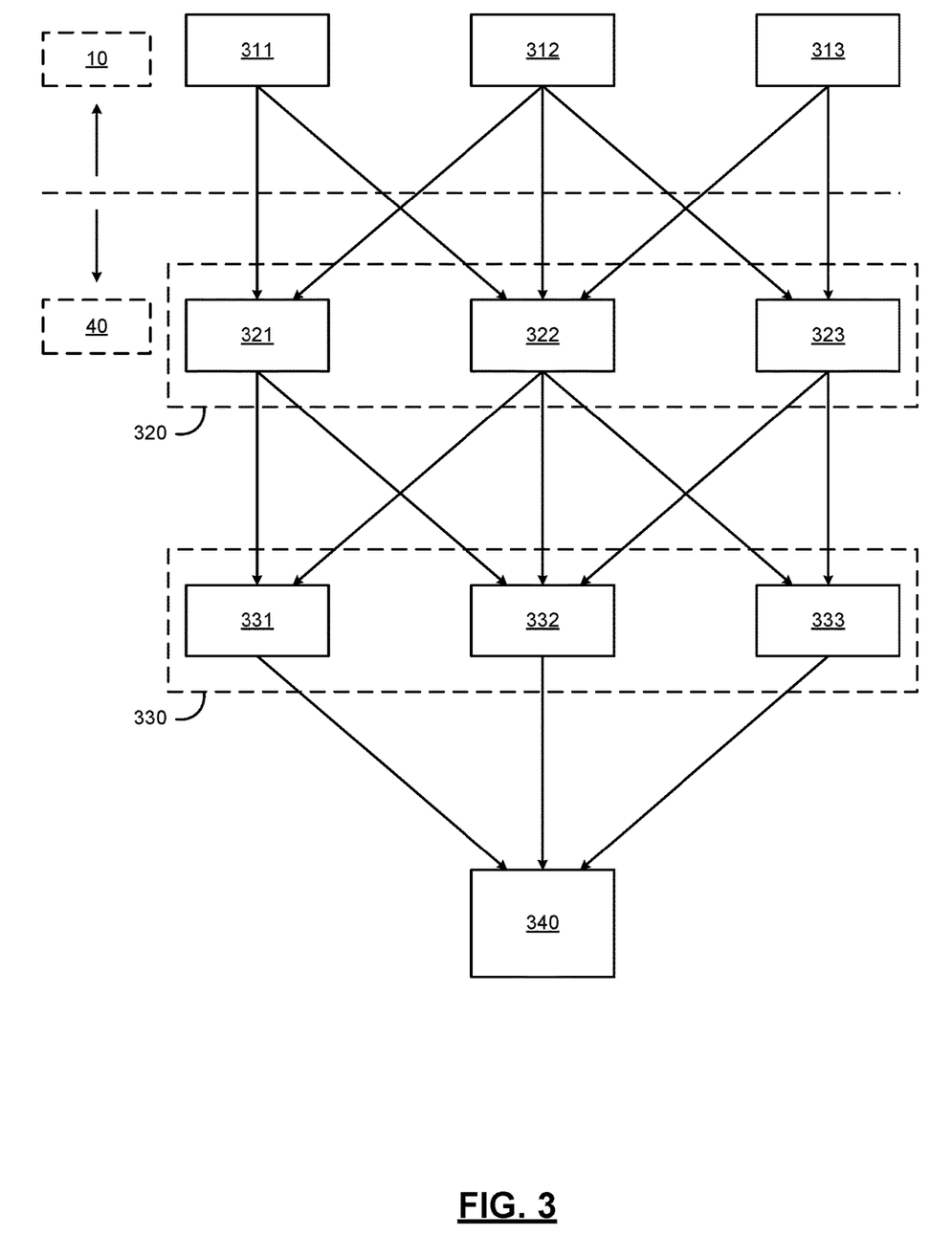
FIG. 3 illustrates the flow of sensor information from the vehicle system to the vehicle communication server according to the principles of the present disclosure.

FIG. 3 illustrates the flow of sensor information from the vehicle system 10 to the vehicle communication server (VCS) 40 according to the principles of the present disclosure. In the vehicle system 10, the advanced computing module 185 may poll a plurality of sensors for sensor data that is useful for evaluating the performance of the driver. For example, vehicle sensor 311 may be one or more accelerometers, vehicle sensor 312 may be a wheel speed sensor, and vehicle sensor 313 may be a vehicle camera. The advanced computing module 185 then uploads the polled sensor data to the VCS 40.

The VCS 40 comprises a plurality of data processing modules, including a driver behavior module 320, a behavior characterization module 330, and a risk assessment module 340. The driver behavior module 320 of the VCS 40 receives the captured sensor data and may identify one or more driver behaviors 321-323. By way of example, the driver behavior module 320 may analyze the sensor data to identify driver behavior 321, which includes, for example, sharp turns, sudden braking, and/or sudden acceleration. The driver behavior module 320 also may analyze the sensor data to identify driver behavior 322, which includes, for example, low speed driving, high speed driving, and speed profiles. Finally, the driver behavior module 320 may analyze the sensor data to identify driver behavior 323, which includes, for example, tailgating, lane changes, drifting across lane markers, drifting onto the shoulder, and the like.

The behavior characterization module 330 of the VCS 40 may then analyze the identified driver behaviors 321-323 to characterize the identified driver behaviors 321-323 into categories associated with the driver, including a microscopic behavior category 331, a macroscopic behavior category 332, and a historical behavior record category 333 associated with the driver. The microscopic behavior category 331 may include speeding, reckless driving, distracted driving, and the like. The macroscopic behavior category 332 may include temporal, spatial, and spatio-temporal hot zones. These may include periods during which a driver engages in more dangerous driving and/or roads where the driver engages in more dangerous driving. The historical behavior record category 333 classifies the driver behaviors according to patterns, occurrences, frequencies, and the like.

The risk assessment module 340 of the VCS 40 may use the microscopic behavior category 331, the macroscopic behavior category 332, and the historical behavior record category 333 to determine a driver profile that may include a risk assessment for the driver of the vehicle system 10. The risk assessment module 340 may use an open-ended regression model for evaluating insurance risk. For example, the VC risk assessment module 340 may characterize each of the selected risk-exposing behaviors using an RFS principle in which: i) a Recency value ($V_R$) indicates how recently a driver exhibited a particular behavior; ii) a Frequency value ($V_F$) indicates how often a driver exhibits this behavior feature; and iii) a Severity value ($V_M$) indicates how severe the behavior is.

The risk assessment module 340 may quantify an implicit occurring rate of this feature ($f_m$) for the driver as:

$$r(f_m, \text{driver}) = w_R V_R + w_F V_F + w_M V_M,$$

where the sum of the weighting factors ($w_R$, $w_F$, $w_M$) equals 1.

The risk assessment module 340 may build a logistic regression model to link the insurance risk with these risk-exposing features:

$$\text{compare} \begin{cases} \rightarrow P = f\left(\frac{1}{1+e^{-\Sigma_i \alpha_i f_i}}\right) \\ \rightarrow P' = g(\text{ground truth data}) \end{cases}$$

The VCS 40 may be configured to monitor the sensor data to make insurance decisions. For example, the VCS 40 may identify that the driver has a low-risk driving style (e.g., large average following distance, infrequent lane changes).

The VCS 40 may automatically generate and send an insurance quote to the driver. The quote may include a favorable rate due to low-risk driving style.

If the VCS 40 identifies the driving style as being more risky, the VCS 40 may not generate a quote. Further, if the driver is currently an insurance customer, the VCS 40 may issue a warning to the driver that insurance rates may be increased unless driving habits change. The VCS 40 may use the sensor information to generate a driver rating and transmit the driver rating to the driver to provide feedback to encourage cautious driving. The VCS 40 may present the driver rating information in an application on a mobile device used by the driver.

Figure 4:
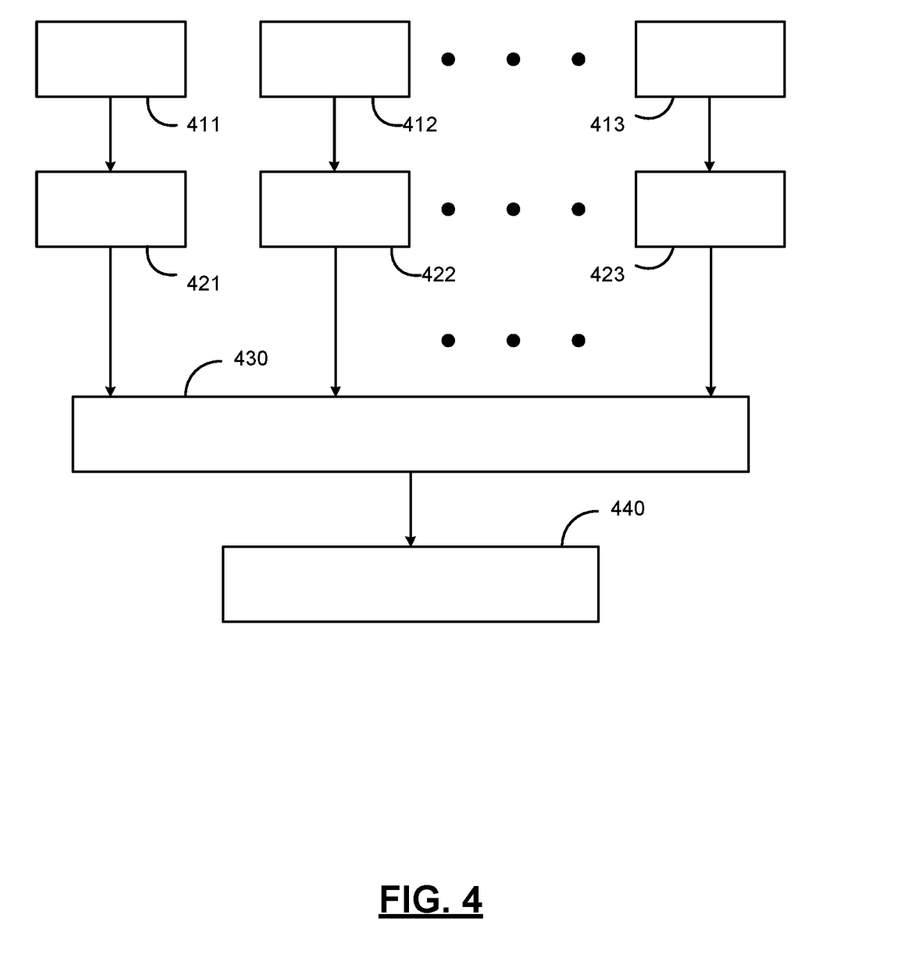
FIG. 4 is a flow diagram illustrating sensor data processing operations in the vehicle system according to the principles of the present disclosure.

FIG. 4 is a flow diagram illustrating sensor data processing operations in the vehicle system 10 according to the principles of the present disclosure. In the vehicle system 10, the individual sensors in the sensors module 188 continually detect N events in real time. By way of example, in 411, an accelerometer may detect a sudden deceleration or acceleration (Event 1 Detection). In 412, a radar or camera may detect an object proximate the front of the vehicle system 10 as it moves (Event 2 Detection). In 413, a camera may detect a lane marker coming closer to the vehicle system 10 (Event N Detection).

Next, either the sensor or the advanced computing module 185 may characterize the detected event. For example, in 421, the advanced computing module 185 may characterize the detected Event 1 as sudden braking. In 422, the advanced computing module 185 may characterize the detected Event 2 as tailgating. In 423, the advanced computing module 185 may characterize the detected Event N as crossing the center lane divider (i.e., drifting into oncoming traffic lanes). In 430, the advanced computing module 185 collects all of the event data and, in 440, sends the event data to VCS 40.

Figure 5:
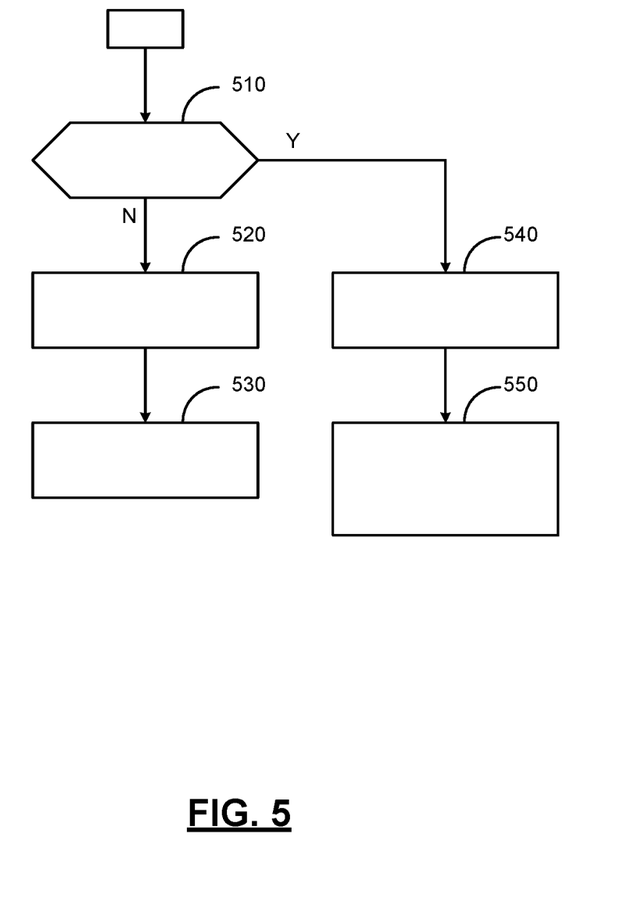
FIG. 5 is a flow diagram illustrating driver alert operations in the vehicle system according to the principles of the present disclosure.

FIG. 5 is a flow diagram illustrating driver alert operations in the vehicle system 10 according to the principles of the present disclosure. FIG. 5 illustrates the operation of the advanced computing module 185 when Call-In mode is supported. In uninterruptible Call-in Mode, the vehicle owner may contact the driver directly. In 510, the advanced computing module 185 determines whether Call-In mode is enabled. If NO in 510, then in 520, the advanced computing module 185 receives message from VCS 40 via the telematics system (e.g., via wireless transceiver module 195). In 530, the advanced computing module 185 displays the receive message on a dashboard screen.

If YES in 510, then in 540, the advanced computing module 185 selects a pre-synthesized announcement corresponding to the event that was detected. In 550, the advanced computing module 185 plays the pre-synthesized announcement through the vehicle speakers. The driver does not have the option to answer or to disconnect. The owner's voice may be played through speakers automatically. Thus, if the vehicle owner is alerted to risky driving behavior and contacts the vehicle operator directly through the telematics system, the driver cannot ignore the owner.

Figure 6:
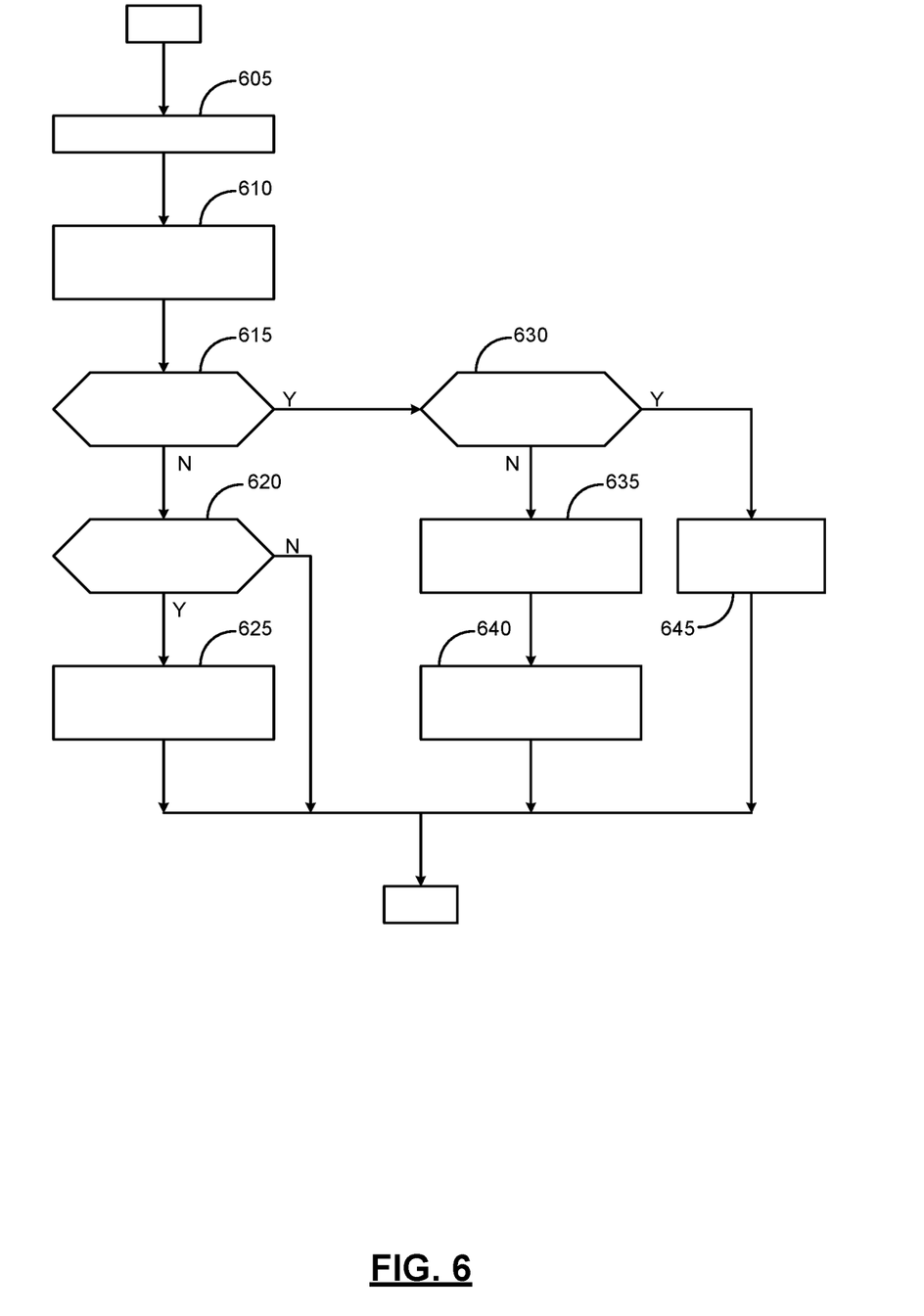
FIG. 6 is a flow diagram illustrating the evaluation of driver performance in the server according to the principles of the present disclosure.

FIG. 6 is a flow diagram illustrating the evaluation of driver performance in the vehicle communication server (VCS) 40 according to the principles of the present disclosure. In 605, the VCS 40 receives sensor data from the vehicle system 10. In 610, the VCS 40 evaluates the driver performance and generates driver metrics as described above in FIGS. 3 and 4. In 615, the VCS 40 determines if the selected driver is a current client of the insurance company that is evaluating the driver performance. If NO in 615, then in 620, the VCS 40 determines if a selected driver metric is less than a threshold value. For example, the VCS 40 may determine if the number of tailgating events in a designated period (e.g., day, week, month) is below a threshold value. If NO in 620, the process ends. If YES in 620, the VCS 40 in 625 may generate an insurance offer at a preferred rate and transmit the offer to the driver and the process ends.

If YES in 615, then in 630, the VCS 40 determines if the selected driver metric is less than a threshold value. If YES in 630, then in 645, the VCS 40 may give a reward or incentive to the driver for being a good driver. In NO in 630, the in 635, the VCS 40 may send a warning message to inform the driver that the driver has had too many events (e.g., too many tailgating incidents) in the defined period. In 640, the VCS 40 may also increase the insurance premium of the driver.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A driver monitoring system configured to monitor the performance of a driver of a vehicle system that is communicating wirelessly with the driver monitoring system, the driver monitoring system comprising:
    a driver behavior module configured to receive from the vehicle system event data captured by a plurality of sensors in the vehicle system and to identify at least one of a plurality of driver behaviors based on the data captured by the plurality of sensors,
    the at least one identified driver behavior including a following distance metric of the driver,
    the following distance metric being determined as a combined factor of vehicle speed following distance, and predicted time to stop, and
    the plurality of sensors including at least one of (a) one or more radar detectors, (b) one or more cameras, and (c) a light detection and ranging (LIDAR) system;
    a behavior characterization module configured to receive from the driver behavior module the at least one identified driver behavior and to characterize the at least one identified driver behavior into at least one of a plurality of behavior categories;
    a risk assessment module configured to analyze the at least one characterized driver behavior in the plurality of behavior categories, to determine therefrom a driver profile that includes a risk assessment for the driver of the vehicle system, and to determine a rate for the driver for each of the at least one characterized driver behavior using the equation:

$$r = w_R V_R + w_F V_F + w_M V_M,$$

where $V_R$ is a recency value indicating how recently the driver exhibited the particular driver behavior, $V_F$ is a frequency value indicating how often the driver exhibits the particular driver behavior, $V_M$ is a severity value indicating how severe the particular driver behavior is, and a sum of weight factors $w_R$, $w_F$, and $w_M$ is equal to 1; and
    at least one of:
        a steering control module configured to control steering of the vehicle based on the data captured by the plurality of sensors;
        a braking control module configured to control braking of the vehicle based on the data captured by the plurality of sensors; and an engine control module configured to control torque output of an engine based on the data captured by the plurality of sensors.

2. The driver monitoring system of claim 1, wherein the driver monitoring system is configured to compare the at least one identified driver behavior to a threshold value and, in response to the comparison, to transmit to the driver a warning message.

3. The driver monitoring system of claim 1, wherein the driver monitoring system is configured to determine if the driver is a client of an insurance provider.

4. The driver monitoring system of claim 3, wherein the driver monitoring system, in response to a determination that the driver is a client of the insurance provider, compares the at least one identified driver behavior to a threshold value associated with the at least one driver behavior.

5. The driver monitoring system of claim 4, wherein the driver monitoring system, in response to a determination that at least one identified driver behavior exceeds the threshold value, transmits to the driver a warning message.

6. The driver monitoring system of claim 5, wherein the warning message informs the driver that the driver has exceed the threshold value.

7. The driver monitoring system of claim 4, wherein the driver monitoring system, in response to a determination that at least one identified driver behavior exceeds the threshold value, increase an insurance premium associated with the driver.

8. The driver monitoring system of claim 4, wherein the driver monitoring system, in response to a determination that at least one identified driver behavior exceeds the threshold value, transmits to an owner of the vehicle system a message informing the owner that the driver has exceed the threshold value.

9. The driver monitoring system of claim 4, wherein the driver monitoring system, in response to a determination that at least one identified driver behavior does not exceed the threshold value, offers a reward to the driver.

10. The driver monitoring system of claim 3, wherein the driver monitoring system is configured to, when the driver is not currently insured, offer an insurance product to the driver when the following distance metric is less than a threshold for at least a predetermined period.

11. The driver monitoring system of claim 1, wherein the at least one identified driver behavior further includes at least one of: sharp turns, sudden braking, sudden acceleration, high-speed driving, low-speed driving, tailgating, and frequent lane changes.

12. A method of monitoring the performance of a driver of a vehicle system that is communicating wirelessly with a driver monitoring system, the method comprising:
in the driver monitoring system, receiving from the vehicle system event data captured by a plurality of sensors in the vehicle system, the plurality of sensors including at least one of (a) one or more radar detectors, (b) one or more cameras, and (c) a light detection and ranging (LIDAR) system;
identifying at least one of a plurality of driver behaviors based on the data captured by the plurality of sensors, the at least one identified driver behavior including a following distance metric of the driver,
the following distance metric being determined as a combined factor of vehicle speed following distance, and predicted time to stop;
characterizing the at least one identified driver behavior into at least one of a plurality of behavior categories;
analyzing the at least one characterized driver behavior in the plurality of behavior categories to determine therefrom a driver profile that may include a risk assessment for the driver of the vehicle system;
determining a rate for the driver for each of the at least one characterized driver behavior using the equation:

$$r = w_R V_R + w_F V_F + w_M V_m,$$

where $V_R$ is a recency value indicating how recently the driver exhibited the particular driver behavior, $V_F$ is a frequency value indicating how often the driver exhibits the particular driver behavior, $V_M$ is a severity value indicating how severe the particular driver behavior is, and a sum of weight factors $w_R$, $w_F$, and $w_M$ is equal to 1; and
at least one of:
controlling steering of the vehicle based on the data captured by the plurality of sensors;
controlling braking of the vehicle based on the data captured by the plurality of sensors; and
torque output of an engine based on the data captured by the plurality of sensors.

13. The method of claim 12, further comprising:
comparing the at least one identified driver behavior to a threshold value and, in response to the comparison, transmitting to the driver a warning message.

14. The method of claim 12, further comprising determining if the driver is a client of an insurance provider.

15. The method of claim 14, further comprising:
in response to a determination that the driver is a client of the insurance provider, comparing the at least one identified driver behavior to a threshold value associated with the at least one driver behavior.

16. The method of claim 15, further comprising:
in response to a determination that at least one identified driver behavior exceeds the threshold value, transmitting to the driver a warning message.

17. The method of claim 16, wherein the warning message informs the driver that the driver has exceed the threshold value.

18. The method of claim 15, further comprising:
in response to a determination that at least one identified driver behavior exceeds the threshold value, increasing an insurance premium associated with the driver.

19. The method of claim 15, further comprising:
in response to a determination that at least one identified driver behavior exceeds the threshold value, transmitting to an owner of the vehicle system a message informing the owner that the driver has exceed the threshold value.

20. The method of claim 15, further comprising:
in response to a determination that at least one identified driver behavior does not exceed the threshold value, offering a reward to the driver.

21. The method of claim 12, wherein the at least one identified driver behavior further includes at least one of: sharp turns, sudden braking, sudden acceleration, high-speed driving, low-speed driving, tailgating, and frequent lane changes.

* * * * *